United States Patent
Mitchell et al.

(10) Patent No.: US 12,265,496 B2
(45) Date of Patent: Apr. 1, 2025

(54) DYNAMIC TOPOLOGY DISCOVERY AND MANAGEMENT WITH PROTOCOL DETECTION

(71) Applicant: Advanced Micro Devices, Inc., Santa Clara, CA (US)

(72) Inventors: Brian Mitchell, Austin, TX (US); George D. Azevedo, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 37 days.

(21) Appl. No.: 17/855,106

(22) Filed: Jun. 30, 2022

(65) Prior Publication Data

US 2024/0004823 A1 Jan. 4, 2024

(51) Int. Cl.
*G06F 13/42* (2006.01)

(52) U.S. Cl.
CPC ...... *G06F 13/4221* (2013.01); *G06F 13/4282* (2013.01); *G06F 2213/0026* (2013.01); *G06F 2213/0028* (2013.01)

(58) Field of Classification Search
CPC ............. G06F 13/4221; G06F 13/4282; G06F 2213/0026; G06F 2213/0028
USPC ................................. 710/11, 16, 33, 62, 105
See application file for complete search history.

(56) References Cited

U.S. PATENT DOCUMENTS

| | | | | |
|---|---|---|---|---|
| 5,590,313 A | * | 12/1996 | Reynolds | G06F 13/102 710/11 |
| 6,965,574 B1 | * | 11/2005 | Cook | H04L 41/142 370/252 |
| 7,254,650 B2 | * | 8/2007 | Lin | G06K 19/07 710/10 |
| 7,711,886 B2 | | 5/2010 | Foster, Sr. | |
| 7,836,238 B2 | | 11/2010 | Freimuth et al. | |
| 7,945,769 B2 | | 5/2011 | Hong et al. | |
| 9,537,808 B1 | * | 1/2017 | Giansiracusa | H04L 51/18 |
| 9,542,195 B1 | | 1/2017 | Astarabadi et al. | |

(Continued)

OTHER PUBLICATIONS

International Search Report and Written Opinion in International Application No. PCT/US2023/022075, mailed Aug. 8, 2023, 9 pages.

*Primary Examiner* — Idriss N Alrobaye
*Assistant Examiner* — Henry W Yu
(74) *Attorney, Agent, or Firm* — Kowert, Hood, Munyon, Rankin & Goetzel, P.C.; Rory D. Rankin

(57) ABSTRACT

An apparatus and method for efficiently supporting multiple peripheral communication protocols in a computing system. A computing system includes multiple servers with one or more of the servers using multiple connectors for connecting to multiple peripheral devices such as data storage devices. At least one of the connectors is able to support multiple communication protocols, rather than a single communication protocol. A processor of the server determines a peripheral device has been attached to a connector that supports multiple communication protocols, and the processor determines whether one of the multiple communication protocols supported by the particular connector matches the attached peripheral device's communication protocol. If so, the processor configures the connector with the matching communication protocol. Otherwise, the processor generates an indication that specifies that there is no match.

20 Claims, 5 Drawing Sheets

(56) References Cited

U.S. PATENT DOCUMENTS

| | | | |
|---|---|---|---|
| 9,547,615 B2* | 1/2017 | Bell | G06F 13/387 |
| 10,120,823 B2 | 11/2018 | Waidhofer et al. | |
| 11,093,431 B2 | 8/2021 | Guevara et al. | |
| 2015/0278139 A1* | 10/2015 | Pamley | G06F 13/4022 |
| | | | 710/313 |
| 2016/0026596 A1* | 1/2016 | Klein | G06F 13/4068 |
| | | | 710/313 |
| 2016/0112821 A1 | 4/2016 | Raleigh | |
| 2016/0259568 A1* | 9/2016 | Grimsrud | G06F 3/0661 |
| 2018/0239696 A1* | 8/2018 | Lim | G06F 3/0679 |
| 2020/0356303 A1 | 11/2020 | Shaver | |
| 2020/0374760 A1* | 11/2020 | Lohar | H04W 36/0066 |
| 2023/0216705 A1* | 7/2023 | van Dijk | H04L 1/0045 |
| | | | 710/305 |

* cited by examiner

DYNAMIC TOPOLOGY DISCOVERY AND MANAGEMENT WITH PROTOCOL DETECTION

BACKGROUND

Description of the Relevant Art

In computing systems, multiple applications exploit parallel processing and large amounts of shared memory. Examples of these applications are machine learning applications, entertainment and real-time applications, as well as some business, scientific, medical and other applications. As computer memory storage and data bandwidth increase, so does the amount and complexity of data that organizations daily manage. To support multiple client computing devices running multiple various applications, an organization uses a distributed storage system. In some cases, such a system is a cluster of servers placed in one or more rooms of a building. The servers are connected to multiple peripheral devices such as data storage devices. In many cases, the cluster of servers are included in a datacenter.

Organizations frequently upgrade the cluster of servers due to the increasing demand for data storage and low latency data maintenance. For example, as workloads change or become more critical, the types of peripheral devices to support changes. These peripheral devices use different interfaces, each with a respective communication protocol. The motherboards of the servers, though, already support a particular number and types of communication protocols. Upgrading the motherboards is expensive. Additionally, each of the multiple servers being taken down during the upgrade process temporarily reduces the computing throughput of the cluster of servers. Further, the upgraded motherboards can run software that is inconsistent with the versions or the types of software running on motherboards that have not yet been upgraded.

In view of the above, methods and systems for efficiently supporting multiple peripheral communication protocols in a computing system are desired.

Figure 1:
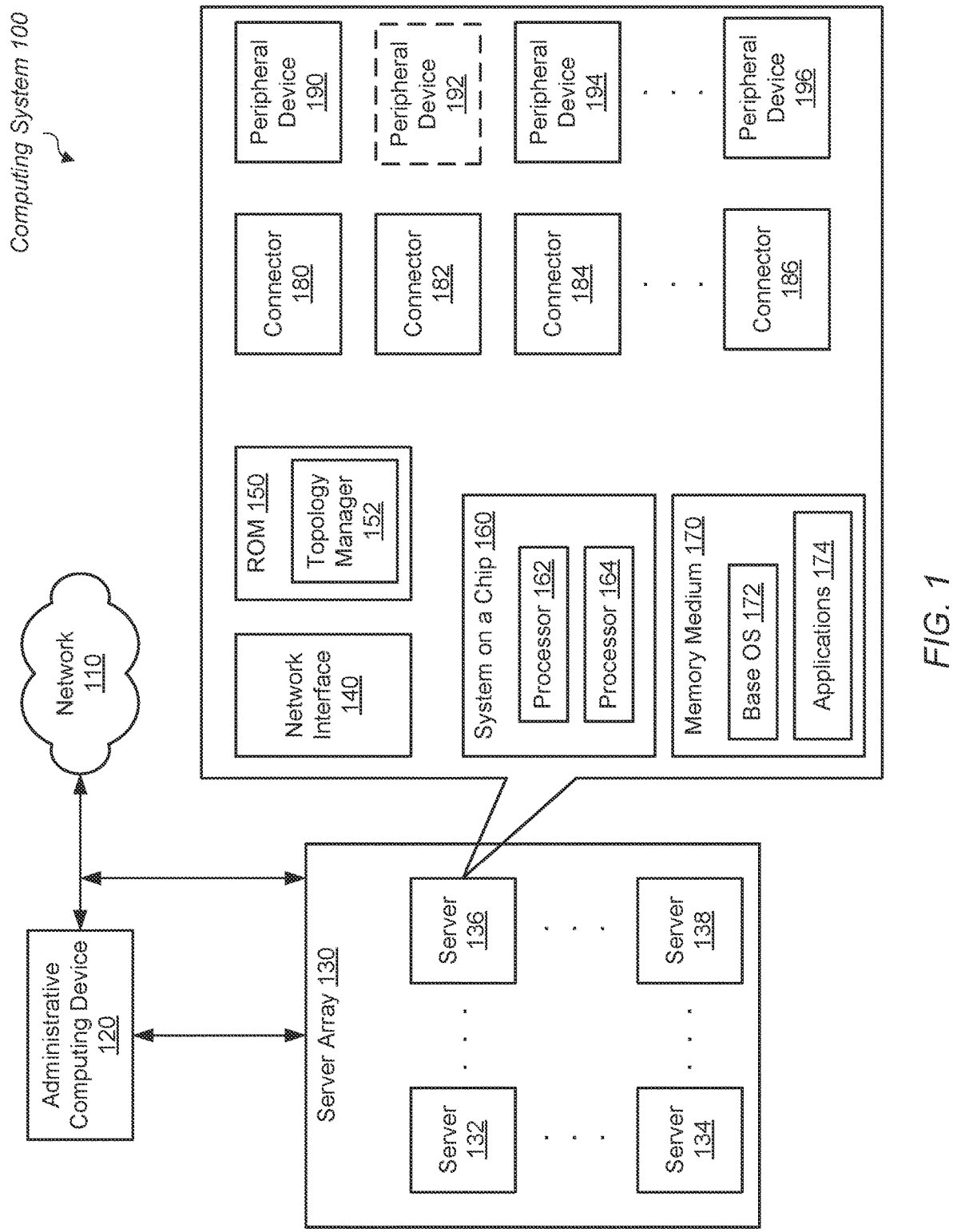
FIG. 1 is a generalized block diagram of a computing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently supporting multiple peripheral communication protocols in a computing system are contemplated. In various implementations, a computing system includes a server array with multiple servers. In an implementation, the server array is used in a datacenter environment. One or more of the servers are connected to multiple peripheral devices such as data storage devices. One or more of the servers use multiple connectors for connecting to multiple peripheral devices. At least one of the connectors is able to support multiple communication protocols, rather than a single communication protocol. Such support offers greater flexibility when configuring the server array that has frequent upgrades due to an increasing demand for data storage and low latency data maintenance. A processor of the server determines a peripheral device has been attached to a particular connector of the multiple connectors that supports multiple communication protocols. The processor determines that the attached peripheral device supports a particular communication protocol. The processor also searches the multiple communication protocols supported by the particular connector.

If the processor finds a communication protocol supported by the connector that matches the peripheral device's communication protocol, then the processor configures the connector with the matching communication protocol. Otherwise, the processor generates an indication that specifies that there is no match. In an implementation, the indication is an error message stored in a log file or other file located in a known, particular location that can be accessed by a system administrator. In another implementation, the processor sends the error message to the system administrator's computing device, which is provided to a user by a graphical user interface (GUI) or by an open text window. The indication helps the system administrator reduce time debugging when a faulty system configuration is being set up mistakenly. Further details of efficiently supporting multiple peripheral communication protocols in a computing system are provided in the following discussion.

Referring to FIG. 1, a generalized block diagram of one implementation of a computing system 100 is shown. As shown, the computing system 100 includes the server array 130 that uses multiple servers 132-138 that are interconnected to one another. The server array 130 is also connected to client computer systems (not shown) via at least the network 110. A system administrator or other user manages the server array 130 using the administrative computing device 120 (or computing device 120). The computing device 120 is any of a variety of computing devices such as a desktop computer, a laptop computer, a tablet computer, a smartphone, and so on. In an implementation, the server array 130 is a grid of a relatively high number of servers 132-138 such as hundreds, thousands, or tens of thousands of server computers (or servers).

In some implementations, the server array 130 is a cluster or grid of servers that are grouped into what is referred to as a "server farm." The server farm includes one or more server arrays such as server array 130. In an implementation, the server farm is used as a datacenter that provides a centralized repository for the storage, management, and dissemination of data pertaining to one or more businesses. Due to the high number of servers 132-138 in the server array 130, the computing device 120 uses automated management applications. Additionally, it is possible that multiple external users and companies share access of the server array 130, and the computing device 120 also runs security applications. In some implementations, the applications for the automated management and the security management are run on multiple computing devices with secure access by the system administrator.

As shown, similar to the other servers 132, 134 and 138 of the server array 130, the server 136 includes at least the multiple components 140-196. The network interface 140 includes hardware, such as circuitry, for supporting a communication protocol that enables communication with the network 110. The network interface 140 includes one or more queues for storing requests, responses and messages. The circuitry of the network interface 140 also builds packets for transmitting to the network 110, and disassembles packets received from network 110. The functionality of network interface 140 can be included on a network adapter card. The system on a chip (SoC) 160 includes a variety of processing units and functional blocks providing a variety of functionalities such as at least processors 162-164. For example, in some implementations, the SoC 160 includes one or more of a central processing unit (CPU) with circuitry used for processing instructions of a selected instruction set architecture (ISA), a graphics processing unit (GPU) with circuitry that implements a high parallel data microarchitecture, one or more application specific integrated circuits (ASICs) or microcontrollers, and so on. The memory medium 170 is one of variety of types of a hard disk drive (HDD) and stores a base operating system (OS) 172, one or more applications 174, and data (not shown). The server 136 also includes multiple connectors 180-186.

In some implementations, each of the connectors 180-186 provides an interface such as a socket or a slot on a motherboard of the server 136. The peripheral devices 190-196 transfer data with semiconductor chips on the motherboard of the server 136 through the connectors 180-186. In some implementations, the peripheral devices 190-196 are data storage devices. For example, one or more of the peripheral devices 190-196 include solid-state drive (SSD) technology such as using Flash memory for providing low read access and latency times. A solid-state drive is also referred to as a solid-state disk. One or more of the peripheral devices 190-196 can also be one of a variety of types of a hard disk driver (HDD).

Each of the connectors 180-186 includes multiple pins. A particular type of signal of multiple signal types is transmitted on a particular pin of the multiple pins based on a predetermined assignment. This assignment, or mapping, of the multiple signal types to the multiple pins is defined by a particular communication protocol used to transfer data through one of the connectors 180-186. In addition, the physical size and placement of the pins are set by what is referred to as a "form factor" of a connector of the connectors 180-186. The form factor is the specified mechanical properties of a connector of the connectors 180-186 such as the length and the width of the connector, the number of pins of the connector, the placement and spacing of the pins, and so forth. An example of a form factor used for the connectors is the U.3 form factor that follows the SFF-TA-1001 specification. In some implementations, a cable is used to transfer data between the motherboard of the server 136 and one of the peripheral devices 190-196. The physical traits of the cable end that is inserted into a connector of the connectors 180-186 are determined by the form factor of the connector of the connectors 180-186.

In addition to pin assignment of one or more connectors of the connectors 180-186, a particular communication protocol determines multiple characteristics used for data transfer. The communication protocol characteristics include one or more of a number of supported clock frequencies and data transfer rates, a number of particular voltage levels to use for transferring the signals through the connector, assignment of which signals (and corresponding assigned pins) are bidirectional, data bus or lane widths, and so forth. The communication protocol also defines an architecture for transferring data such as defining fields within packets, assigning placement of those fields within a packet, defining the steps of a training process, defining power management steps, defining slot detection steps, and so on. Examples of the communication protocols are the Peripheral Component Interconnect Express (PCIe) protocol, the Serial Advanced Technology Attachment (SATA) protocol, the Serial Attached SCSI (SAS) protocol, the Non-Volatile Memory Express (NVMe) protocol, and so forth.

In various implementations, one or more of the connectors 180-186 supports multiple communication protocols, rather than a single communication protocol. Such support offers greater flexibility when configuring the server array 130 that has frequent upgrades due to an increasing demand for data storage and low latency data maintenance. To support multiple communication protocols for one or more of the connectors 180-186, one of the processors 162-164 of the SoC 160 executes instructions of the topology manager 152. In an implementation, the topology manager 152 is firmware stored in the read only memory (ROM) 150. In another implementation, the topology manager 152 is one of the applications 174 stored in the memory medium 170. In an implementation, the processor of the processors 162-164 that executes the topology manager 152 is not the general-purpose CPU so as not to interrupt any processing being performed by the CPU.

In one example, when the peripheral device 190 has been attached to the connector 180 (e.g., such as having a corresponding cable end inserted in the connector 180, plugging a card into a connector, etc.), the predetermined slot detection steps defined by the form factor, such as the U.3 form factor in one implementation, determines the type of the peripheral device 190. The processor 162 (or another processor) receives an indication of the peripheral device 190 being connected to the connector 180 and the communication protocol supported by the peripheral device 190. In response, the processor 162 executes the instructions of the topology manager 152 and searches the multiple communication protocols supported by the connector 180. In an implementation, one or more of the topology manager 152 and configuration registers accessible by the processor 162 store indications of the multiple communication protocols supported by the connector 180.

If the processor 162 identifies a communication protocol supported by the connector 180 that matches the communication protocol supported by the peripheral device 190, then the processor 162 configures the connector 180 with the matching communication protocol. Otherwise, the processor 162 generates an indication that specifies that there is no match. In an implementation, the indication is an error message stored in a log file or other file located in a known, particular location that can be accessed by a system administrator. In another implementation, the processor 162 sends the error message to the system administrator's computing device 120, which is provided to a user by a graphical user interface (GUI) or by an open text window. The indication helps the system administrator reduce time debugging when a faulty system configuration is being set up mistakenly.

Figure 2:
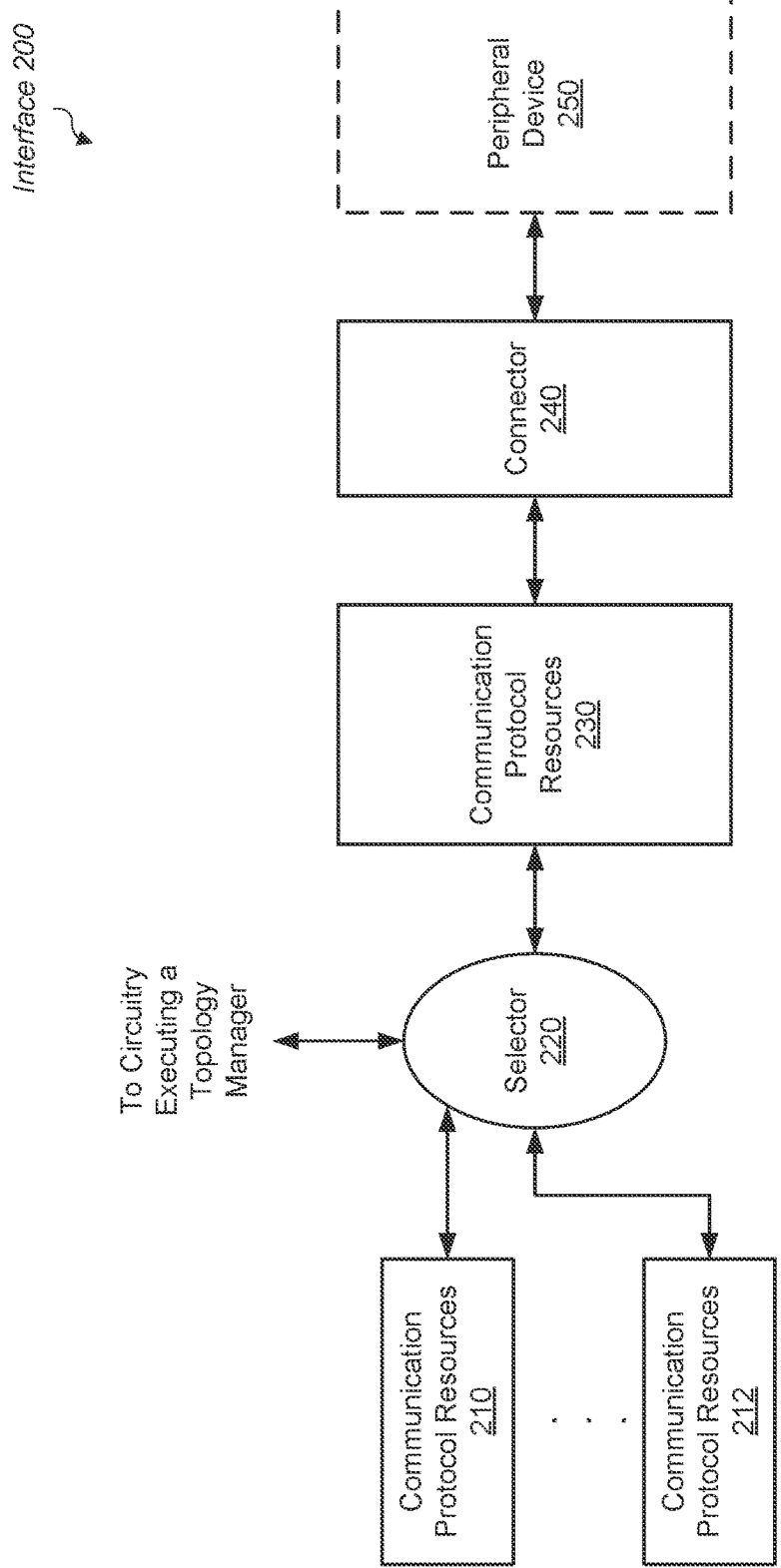
FIG. 2 is a generalized block diagram of an interface.

Turning now to FIG. 2, a generalized block diagram of one implementation of an interface 200 is shown. In various implementations, the interface 200 includes the multiple communication protocol resources 210-212, the selector 220, the communication protocol resources 230 chosen from the multiple communication protocol resources 210-212 by the selector 220, and the connector 240 that allows data transfer with the peripheral device 250. In various implementations, the connector 240 has the functionality of the connectors 180-186 (of FIG. 1), and the peripheral device 250 has the functionality of the peripheral devices 190-196 (of FIG. 1). In an implementation, each of the communication protocol resources 210-212 and 230 (or resources 210-212 and 230) includes configuration registers that store parameters to use for a particular communication protocol such as one or more of a number of supported clock frequencies and data transfer rates, a number of particular voltage levels to use for transferring the signals through the connector, assignment of which signals (and corresponding assigned pins) are bidirectional, data bus or lane widths, and so forth. The selector 220 selects one of the resources 210-212 based on an indication from circuitry that executes a topology manager. In an implementation, the circuitry is circuitry of a processor of a server.

In some implementations, during a bootup operation, a processor (not shown) that executes a topology manager determines whether the connector 240 has a peripheral device connected. If so, the processor searches the multiple communication protocols supported by the connector 240. In an implementation, the topology manager stores indications of the supported multiple communication protocols. In another implementation, the processor checks the contents of particular configuration registers that store indications of the supported multiple communication protocols. The processor determines whether a communication protocol for the peripheral device 250 based on a type of the peripheral device 250 matches any of the multiple communication protocols supported by the connector 240. If so, the processor both loads configuration registers corresponding to the resources 210-212 with parameters of the supported multiple communication protocols and sends an indication to the selector 220 to select the matching resources of the multiple resources 210-212. The resources 230 receive and are updated by the selected one of the multiple resources 210-212. By doing so, the processor reconfigures the connector 240 with information corresponding to the matching communication protocol.

If the processor is unable to find a match between the communication protocol of the peripheral device 250 and any of the multiple communication protocols supported by the connector 240, then the processor sends an indication to the selector 220 to provide information to the resources 230 specifying that no communication protocol is being supported. This step prevents any data transfer with the peripheral device 250. Additionally, the processor loads configuration registers corresponding to the resources 210-212 with parameters of the supported multiple communication protocols. None of these parameters are sent yet to the resources 230, since there is no peripheral device attached to the connector 240. However, the parameters are ready for when a peripheral device is later attached to the connector 240.

Figure 3:
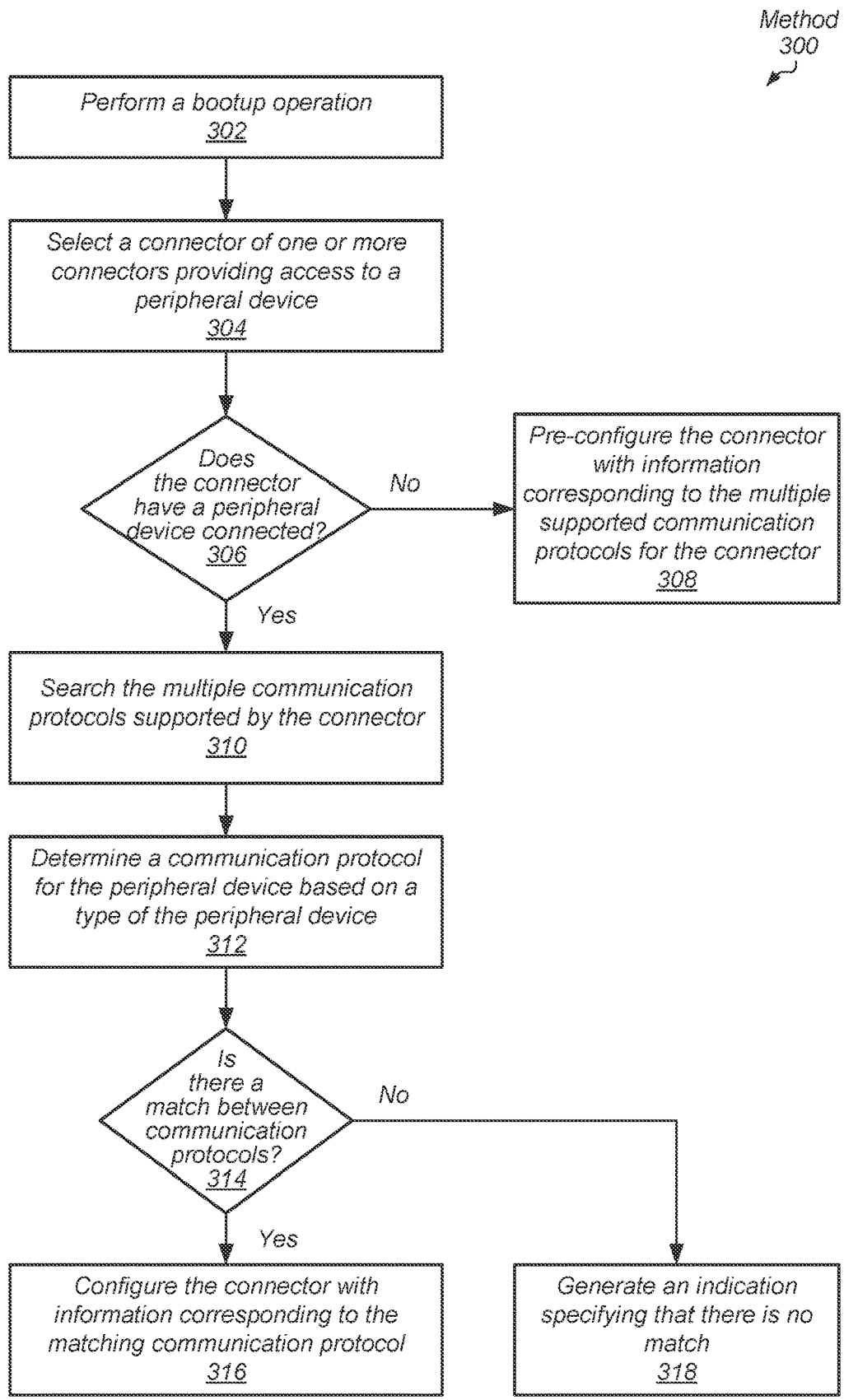
FIG. 3 is a generalized block diagram of a method for supporting multiple peripheral communication protocols in a computing system.

Referring to FIG. 3, a generalized block diagram is shown of a method 300 for efficiently supporting multiple peripheral communication protocols in a computing system. For purposes of discussion, the steps in this implementation (as well as in FIGS. 4-5) are shown in sequential order. However, in other implementations some steps occur in a different order than shown, some steps are performed concurrently, some steps are combined with other steps, and some steps are absent.

A computing system includes a server array with multiple servers. In an implementation, the server array is used in a datacenter environment. One or more of the servers are connected to multiple peripheral devices such as data storage devices. One or more of the servers use multiple connectors for connecting to multiple peripheral devices. At least one of the connectors is able to support multiple communication protocols, rather than a single communication protocol. Such support offers greater flexibility when configuring the server array that has frequent upgrades due to an increasing demand for data storage and low latency data maintenance. At least the hardware and software of a particular server of the multiple servers performs a bootup operation (block 302). Hardware of a processor, such as circuitry, executing the instructions of a topology manager selects a connector of one or more connectors providing access to a peripheral device (block 304).

If the processor determines that the connector does not have a peripheral device connected ("no" branch of the conditional block 306), then the processor pre-configures the connector with information corresponding to the multiple supported communication protocols for the connector (block 308). Otherwise, if the processor determines that the connector has a peripheral device connected ("yes" branch of the conditional block 306), then the processor searches the multiple communication protocols supported by the connector (block 310).

The processor determines a communication protocol for the peripheral device based on a type of the peripheral device (block 312). If the processor determines that there is a match between communication protocols ("yes" branch of the conditional block 314), then the processor configures the connector with information corresponding to the matching communication protocol (block 316). Otherwise, if the processor determines that there is no match between communication protocols ("no" branch of the conditional block 314), then the processor generates an indication specifying that there is no match (block 318).

Figure 4:
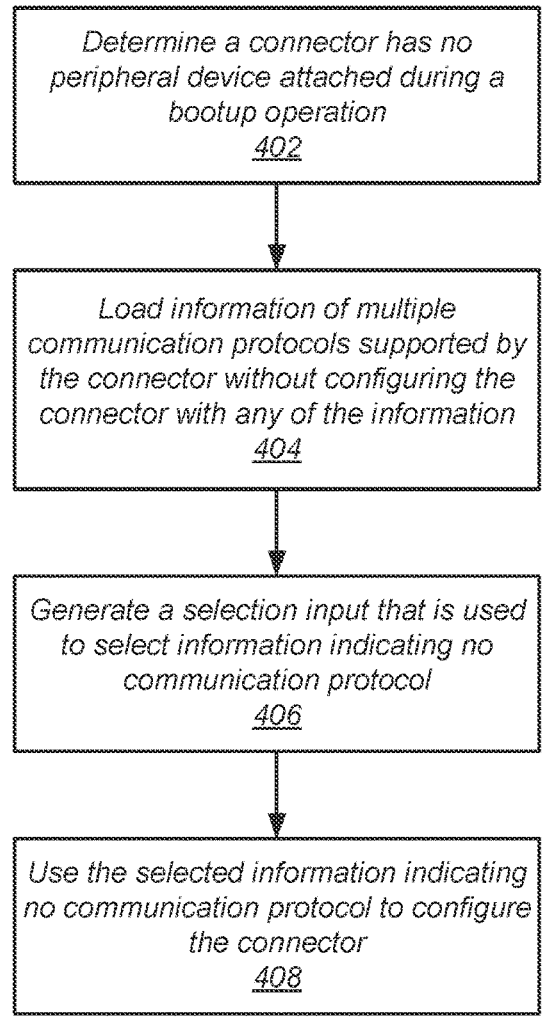
FIG. 4 is a generalized block diagram of a method for supporting multiple peripheral communication protocols in a computing system.

Turning now to FIG. 4, a generalized block diagram is shown of a method 400 for efficiently supporting multiple peripheral communication protocols in a computing system. Hardware of a processor, such as circuitry, executing the instructions of a topology manager determines a connector has no peripheral device attached during a bootup operation (block 402). The processor loads information of multiple communication protocols supported by the connector without configuring the connector with any of the information (block 404). The processor generates a selection input that is used to select information indicating no communication protocol (block 406). The processor uses the selected information indicating no communication protocol to configure the connector (block 408). Therefore, the connector is unable to transfer data.

In some implementations, the processor also generates an indication that specifies that there is no match. In an implementation, the indication is a message stored in a log file or other file located in a known, particular location that can be accessed by a system administrator. In another implementation, the processor sends the message to the system administrator's computing device, which is provided to a user by a graphical user interface (GUI) or by an open text window. The message alerts the system administrator that there is no peripheral device connected. A lack of connection could have been intentional, but also unintentional. If unintentional, the system administrator is alerted. The indication helps the system administrator reduce time debugging when a faulty system configuration is being set up mistakenly.

Figure 5:
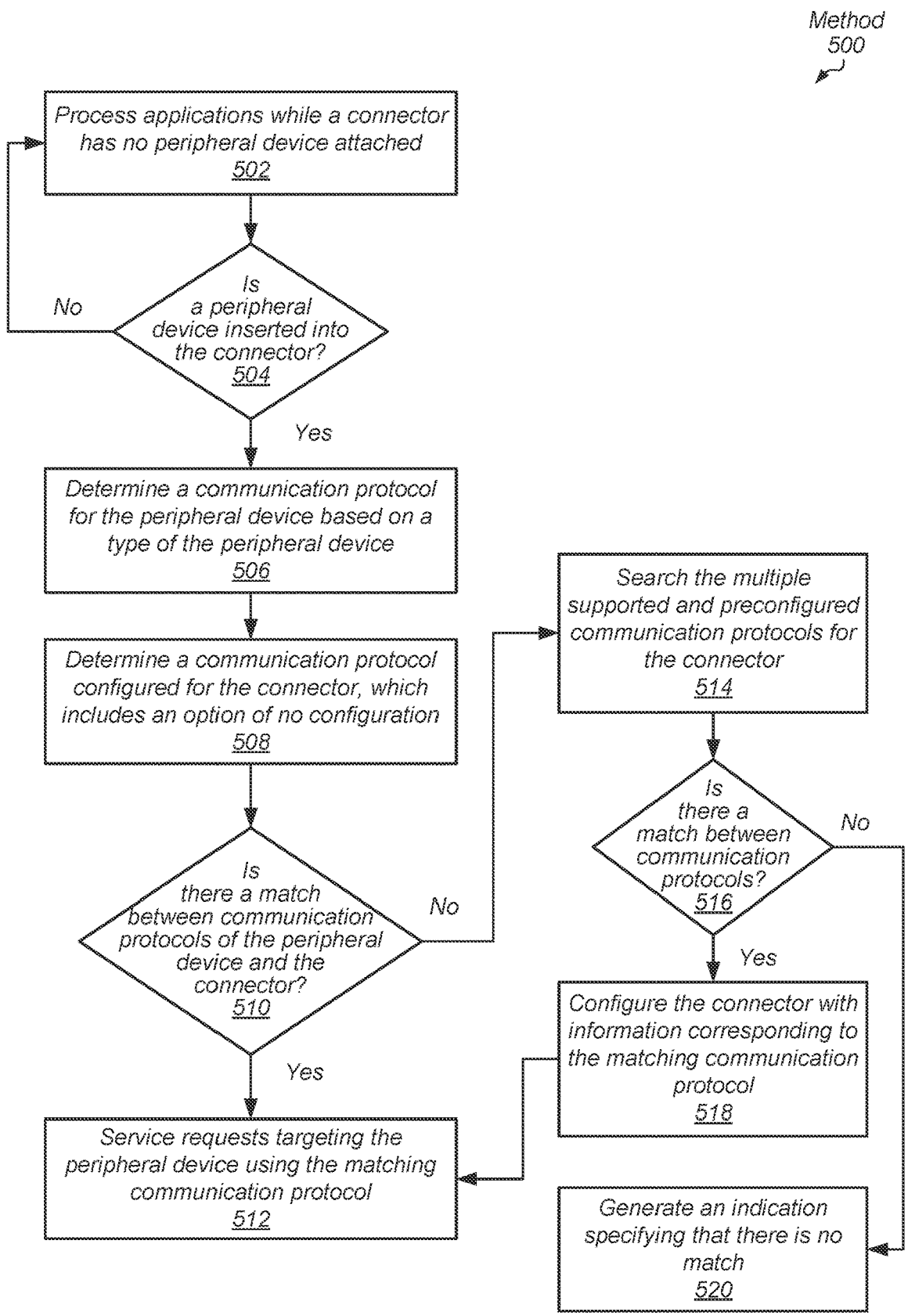
FIG. 5 is a generalized block diagram of a method for supporting multiple peripheral communication protocols in a computing system.

Turning now to FIG. 5, a generalized block diagram is shown of a method 500 for efficiently supporting multiple peripheral communication protocols in a computing system. Hardware of a processor, such as circuitry, processes applications while a connector has no peripheral device attached (block 502). If the processor determines that a peripheral device is not inserted into, or otherwise coupled to, the connector ("no" branch of the conditional block 504), then control flow of method 500 returns to block 502. However, if the processor determines that a peripheral device is inserted into the connector ("yes" branch of the conditional block 504), then the processor determines a communication protocol for the peripheral device based on a type of the peripheral device (block 506). In some cases, the peripheral device inserted into the connector has been inserted since a bootup operation and remains inserted into the connector. In another case, a first peripheral device was inserted into the connector and detected during the bootup operation. Later, the first peripheral device can be removed from the connector, and a second peripheral device can be attached to the connector. It is possible that the second peripheral device supports a same communication protocol as the first peripheral device. It is also possible that the second peripheral device supports a different communication protocol from the first peripheral device. It is further possible that the second peripheral device supports a communication protocol that matches one of the multiple communication protocols supported by the connector. The processor executing the topology manager will determine which case is true.

The processor determines a communication protocol configured for the connector, which includes an option of no configuration (block 508). If the processor determines that there is a match between communication protocols of the peripheral device and the connector ("yes" branch of the conditional block 510), then the processor services requests targeting the peripheral device using the matching communication protocol (block 512). However, if the processor determines that there is no match between communication protocols of the peripheral device and the connector ("no" branch of the conditional block 510), then the processor searches the multiple supported and preconfigured communication protocols for the connector (block 514).

If the processor determines that there is a match between communication protocols ("yes" branch of the conditional block 516), then the processor configures the connector with information corresponding to the matching communication protocol (block 518). Afterward, control flow of method 500 moves to block 512 where the processor services requests targeting the peripheral device using the matching communication protocol. If the processor determines that there is no match between communication protocols ("no" branch of the conditional block 516), then the processor generates an indication specifying that there is no match (block 520).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus comprising:
  a plurality of connectors including a first connector configured to support a plurality of communication protocols; and
  a processor comprising circuitry; and
  wherein in response to a first peripheral device being attached to the first connector of the plurality of connectors, the processor is configured to:
    configure the first connector with a first communication protocol of the plurality of communication protocols, to based on the first peripheral device supporting the first communication protocol; and
    generate an error indication, based on the plurality of communication protocols not including a communication protocol supported by the first peripheral device.

2. The apparatus as recited in claim 1, wherein the processor is further configured to store the error indication in a log file that can be accessed by a system administrator.

3. The apparatus as recited in claim 2, wherein the first peripheral device is a data storage device.

4. The apparatus as recited in claim 1, wherein, in response to a second peripheral device has been attached to a second connector of the plurality of connectors, the circuitry of the processor is configured to:
generate a third indication that the second peripheral device supports a second communication protocol different from the first communication protocol; and
configure the second connector with the second communication protocol of a plurality of communication protocols supported by the second connector, in response to the second connector supports the second communication protocol.

5. The apparatus as recited in claim 4, wherein the processor is further configured to select and use for configuration of the second connector, a third communication protocol of a second plurality of communication protocols, in response to:
the second peripheral device being removed from the second connector; and
a third peripheral device that supports the third communication protocol has been attached to the second connector.

6. The apparatus as recited in claim 1, wherein in response to performing a bootup operation, the processor is further configured to generate a report indicating one or more communication protocols supported by each of the plurality of connectors.

7. The apparatus as recited in claim 6, wherein the processor is further configured to preconfigure a third connector of the plurality of connectors to support a third plurality of communication protocols, in response to:
performing the bootup operation; and
determining the third connector has no peripheral device attached.

8. A method, comprising:
transferring data via a plurality of connectors including a first connector configured to support a plurality of communication protocols;
in response to a first peripheral device being attached to the first connector of the plurality of connectors:
configuring, by circuitry of a processor, a first connector with a first communication protocol of the plurality of communication protocols, based on the first peripheral device supporting the first communication protocol; and
generating, by the processor, an error indication, in response to based on the plurality of communication protocols not including a communication protocol supported by the first peripheral device.

9. The method as recited in claim 8, further comprising storing, by the processor, the error indication in a log file that can be accessed by a system administrator.

10. The method as recited in claim 9, wherein the first peripheral device is a data storage device.

11. The method as recited in claim 8, wherein, in response to a second peripheral device has been attached to a second connector of the plurality of connectors, the method further comprises:
generating, by the processor, a third indication that the second peripheral device supports a second communication protocol different from the first communication protocol; and
configuring the second connector with the second communication protocol of a plurality of communication protocols supported by the second connector, in response to the second connector supports the second communication protocol.

12. The method as recited in claim 11, further comprising selecting and using, by the processor, for configuration of the second connector, a third communication protocol of a second plurality of communication protocols, in response to:
the second peripheral device being removed from the second connector; and
a third peripheral device that supports the third communication protocol has been attached to the second connector.

13. The method as recited in claim 8, wherein in response to performing a bootup operation, the method further comprises generating, by the processor, a report indicating one or more communication protocols supported by each of the plurality of connectors.

14. The method as recited in claim 13, further comprising preconfiguring, by the processor, a third connector of the plurality of connectors to support a third plurality of communication protocols, in response to:
performing the bootup operation; and
determining the third connector has no peripheral device attached.

15. A computing system comprising:
a server array comprising a plurality of servers, wherein a given server of the plurality of servers comprises:
a plurality of connectors including a first connector configured to support a plurality of communication protocols; and
a processor comprising circuitry; and
wherein in response to a first peripheral device being attached to a first connector of the plurality of connectors, the processor is configured to:
configure the first connector with a first communication protocol of the plurality of communication protocols, based on the first peripheral device supporting the first communication protocol; and
generate an error indication, based on the plurality of communication protocols not including a communication protocol supported by the first peripheral device.

16. The computing system as recited in claim 15, wherein the processor is further configured to store the error indication in a log file that can be accessed by a system administrator.

17. The computing system as recited in claim 16, wherein the first peripheral device is a data storage device.

18. The computing system as recited in claim 15, wherein, in response to a second peripheral device has been attached to a second connector of the plurality of connectors, the circuitry of the processor is configured to:
generate a third indication that the second peripheral device supports a second communication protocol different from the first communication protocol; and
configure the second connector with the second communication protocol of a plurality of communication protocols supported by the second connector, in response to the second connector supports the second communication protocol.

19. The computing system as recited in claim 18, wherein the processor is further configured to select and use for configuration of the second connector, a third communication protocol of second plurality of communication protocols, in response to the second peripheral device has been removed from the second connector; and a third peripheral device that supports the third communication protocol has been attached to the second connector.

20. The computing system as recited in claim 15, wherein in response to performing a bootup operation, the processor is further configured to generate a report indicating one or more communication protocols supported by each of the plurality of connectors.

* * * * *

UNITED STATES PATENT AND TRADEMARK OFFICE
CERTIFICATE OF CORRECTION

| | | |
|---|---|---|
| PATENT NO. | : 12,265,496 B2 | Page 1 of 1 |
| APPLICATION NO. | : 17/855106 | |
| DATED | : April 1, 2025 | |
| INVENTOR(S) | : Mitchell et al. | |

It is certified that error appears in the above-identified patent and that said Letters Patent is hereby corrected as shown below:

In the Claims

Column 8, Claim 1, Line 62, please delete "to based on the first" and insert -- based on the first --.

Signed and Sealed this
Eleventh Day of November, 2025

John A. Squires
*Director of the United States Patent and Trademark Office*